O. WARTEMANN.
STEM FOR TOBACCO PIPES.
APPLICATION FILED MAY 7, 1915.
1,168,354.
Patented Jan. 18, 1916.
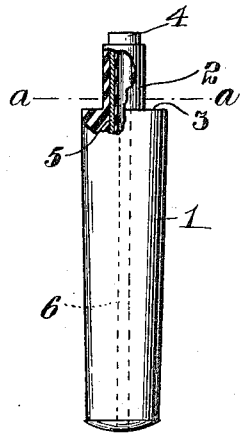
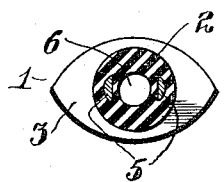 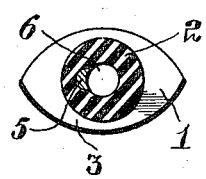
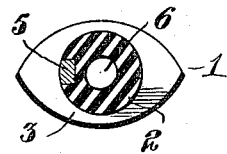 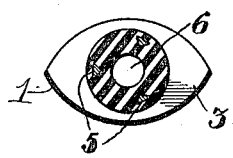
Attest:
Inventor: O. Wartemann
by his Atty

UNITED STATES PATENT OFFICE.

OSKAR WARTEMANN, OF NEW YORK, N. Y., ASSIGNOR TO TRAUN RUBBER COMPANY, OF COLLEGE POINT, NEW YORK, A CORPORATION OF NEW JERSEY.

STEM FOR TOBACCO-PIPES.

1,168,354.   Specification of Letters Patent.   Patented Jan. 18, 1916.

Application filed May 7, 1915. Serial No. 26,452.

*To all whom it may concern:*

Be it known that I, OSKAR WARTEMANN, a citizen of the United States, and a resident of New York city, College Point, borough of Queens, in the county of Queens and State of New York, have invented certain new and useful Improvements in Stems for Tobacco-Pipes, of which the following is a specification.

This invention relates to new and useful improvements in stems for tobacco pipes and particularly to such stems made of hard rubber.

The object of my invention is to provide a hard rubber stem of this kind which is so strengthened and reinforced that it is not apt or liable to be broken when the pipe is held by means of the stem and the mouth of the bowl struck upon a hard object as is done for the purpose of removing all the ashes and so forth from the bowl.

In the accompanying drawings in which like letters of reference indicate like parts in all the figures: Figure 1 is an edge view of a stem for tobacco pipes of conventional appearance, the bore being shown in dotted lines and parts being broken away. Fig. 2 is an enlarged cross sectional view on the line *a—a* of Fig. 1. Figs. 3, 4 and 5 are similar views showing slightly modified constructions.

The pipe stem 1 is made of hard rubber and is provided with a tenon 2 and a shoulder 3 and by preference with a slightly reduced tenon 4 at the upper end of the tenon 2, which tenons 2 and 4 are inserted into a suitable socket in the pipe, in which socket the tenon 2 fits snugly and tightly. The body of the stem, the tenons and the bore of the pipe stem are all molded complete in one operation. The part most apt to break in such a stem is at the shoulder 3 and when the user grasps the pipe by means of the stem 1 and strikes the head against a hard object for the purpose of removing the ashes, it frequently occurs that the stem breaks off at this shoulder 3. For the purpose of strengthening this shoulder and tenon, I mold reinforcing strips 5 into the tenon 2 and the thicker end of the body of the stem, said strips extending lengthwise of the tenon and stem and preferably extending substantially through the entire length of the tenon and about a distance equal to the length of the tenon into the body of the stem as shown in Fig. 1. Such reinforcing strips 5 are made of metal, preferably aluminum or may be made of other metal, such as, brass, iron and so forth or may be made of non-metallic substance, for example, a vulcanized fiber strip which has greater strength and less brittleness than the vulcanized rubber. Such strips may be of any desired cross section as shown in Figs. 2, 3, 4 and 5 and one or more may be provided. As shown in Fig. 2, two such reinforcing strips are provided substantially diametrically opposite each other and they are embedded about midway between the bore 6 of the pipe stem 1 and the outer surface of the tenon. In Fig. 3 but a single strip is provided and that is embedded in the stem flush with the bore. In Fig. 4 but a single strip 5 is provided and that is embedded flush with the outer surface of the stem. In Fig. 5 three such reinforcing strips are provided. The constructions shown in Figs. 3 and 4 are especially adapted for tenons which have very thin side walls. In all cases the strips extend lengthwise through the tenon and into the body of the stem a greater or less distance and thus strengthen and reinforce the tenon so that it is capable of resisting bending strains and is not broken off by tapping the bowl of the pipe on a hard substance. These strips are embedded in the soft rubber mass while molding the same and before vulcanizing. In case more than one strip is used, the strips may be made of the same or different material.

Having described my invention what I claim as new and desire to secure by Letters Patent is:—

A tobacco pipe stem made of vulcanized hard rubber and having a tenon of less diameter than the stem, and a strip of reinforcing material embedded in the rubber and extending lengthwise through the tenon and into the body of the stem, which strip is located between the bore of the stem and the outer surface of the tenon and is surrounded throughout by hard rubber, substantially as set forth.

Signed at New York city, College Point, in the county of Queens and State of New York, this 16th day of March, A. D. 1914.

OSKAR WARTEMANN.

Witnesses:
FELIX SCHWEMER,
BERNHARD W. JANSEN.

Copies of this patent may be obtained for five cents each, by addressing the "Commissioner of Patents, Washington, D. C."